US006584148B1

(12) United States Patent
Zitting et al.

(10) Patent No.: US 6,584,148 B1
(45) Date of Patent: *Jun. 24, 2003

(54) SYSTEM AND METHOD FOR TESTING DIGITAL SUBSCRIBER LINES

(75) Inventors: Brent R. Zitting, Harvest, AL (US);
Robert D. Deaton, Madison, AL (US);
Mark O. Rigby, Madison, AL (US);
Ron M. Roberson, Birmingham, AL (US); Kevin R. Banks, Madison, AL (US); Jeffrey J. Sands, Harvest, AL (US)

(73) Assignee: Nokia Inc., Irving, TX (US)

( * ) Notice: Subject to any disclaimer, the term of this patent is extended or adjusted under 35 U.S.C. 154(b) by 184 days.

This patent is subject to a terminal disclaimer.

(21) Appl. No.: 09/586,330

(22) Filed: Jun. 2, 2000

(51) Int. Cl.[7] .............................. H04M 1/24; H04M 3/00
(52) U.S. Cl. ................. 375/222; 379/27.01; 379/27.03; 379/29.01; 379/32.04
(58) Field of Search ................. 375/219, 222, 375/224, 377; 379/27.01, 27.03, 27.04, 29.01, 29.11, 32.01, 32.04, 27.05, 27.06, 27.07

(56) References Cited

U.S. PATENT DOCUMENTS

| 5,479,439 | A | * | 12/1995 | Bowlin et al. ............ 370/201 |
| 5,528,661 | A |   | 6/1996 | Siu et al. |
| 6,075,784 | A | * | 6/2000 | Frankel et al. ............ 370/356 |
| 6,078,646 | A |   | 6/2000 | McLaughlin et al. |
| 6,177,801 | B1 | * | 1/2001 | Chong ........................ 324/520 |
| 6,215,855 | B1 | * | 4/2001 | Schneider ..................... 379/22 |
| 6,278,769 | B1 | * | 8/2001 | Bella ....................... 379/29.11 |
| 6,301,337 | B1 | * | 10/2001 | Scholtz et al. ................ 379/30 |
| 6,434,221 | B1 | * | 8/2002 | Chong ..................... 379/27.01 |

FOREIGN PATENT DOCUMENTS

WO    WO 99/14921 A    3/1999

OTHER PUBLICATIONS

Teixeria; Pub. No.: US 2002/0009181 A1; Pub. Date: Jan. 24, 2002.*
Marshall, J.F. et al.; ALE—"Testing to the Customer Interface"; British Telecommunictions Engineering; Apr. 1987; pp. 50–56, XP002161746; ISSN: 0362–401X.

* cited by examiner

*Primary Examiner*—Young T. Tse
(74) *Attorney, Agent, or Firm*—Baker Botts LLP; Steven A. Shaw

(57) ABSTRACT

A system for testing a communication path for digital subscriber line (DSL) signals includes a loop management device coupled in the communication path between a DSL access multiplexer (DSLAM) and a DSL modem located at a customer premises. The system also includes a remote test interface coupled in the communication path between the loop management device and the DSL modem. The loop management device and the remote test interface communicate using voice-band signals transmitted over the communication path and collaboratively test the communication path.

19 Claims, 6 Drawing Sheets

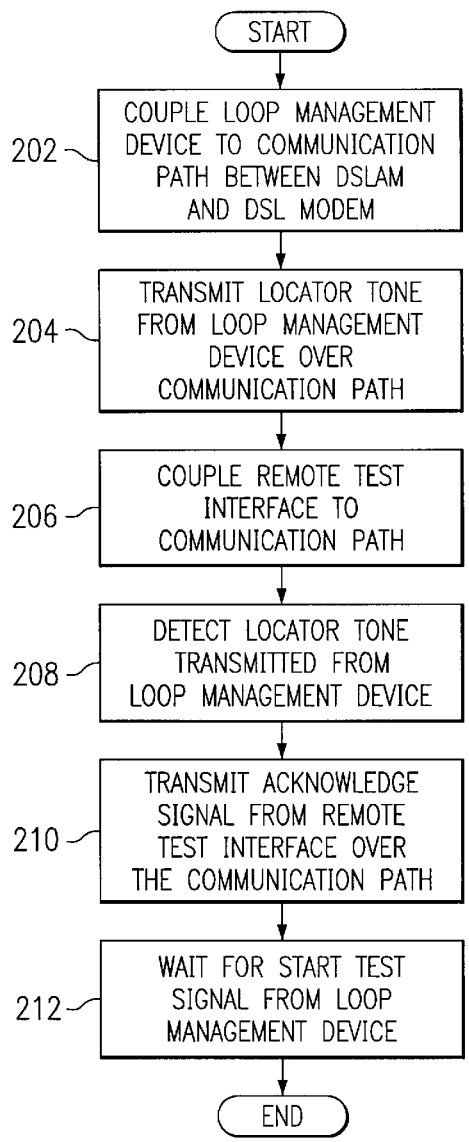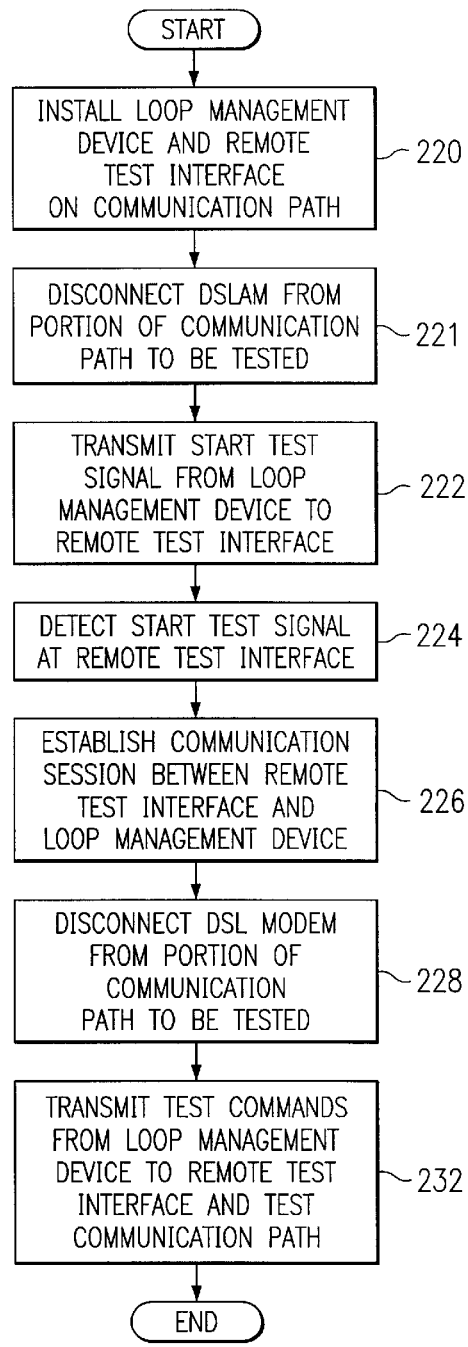

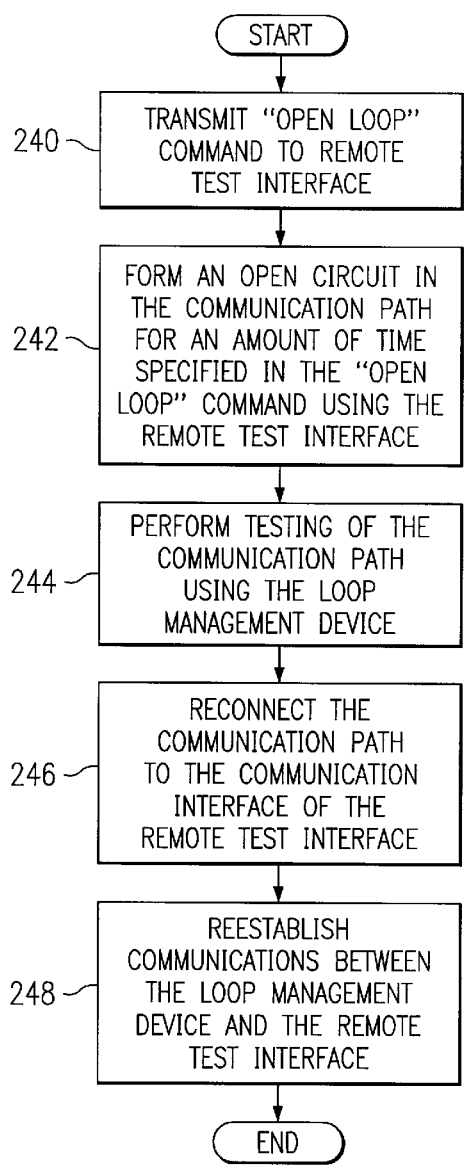
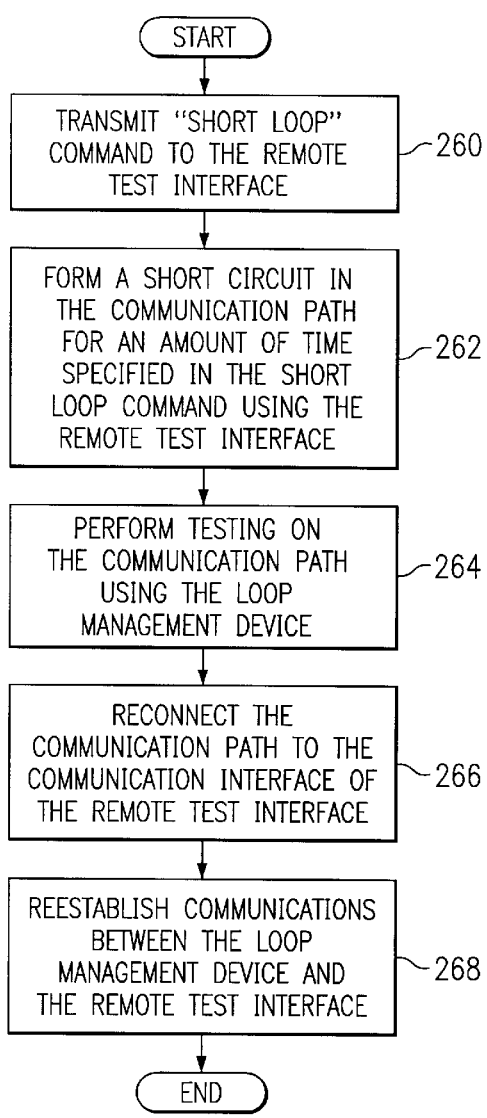

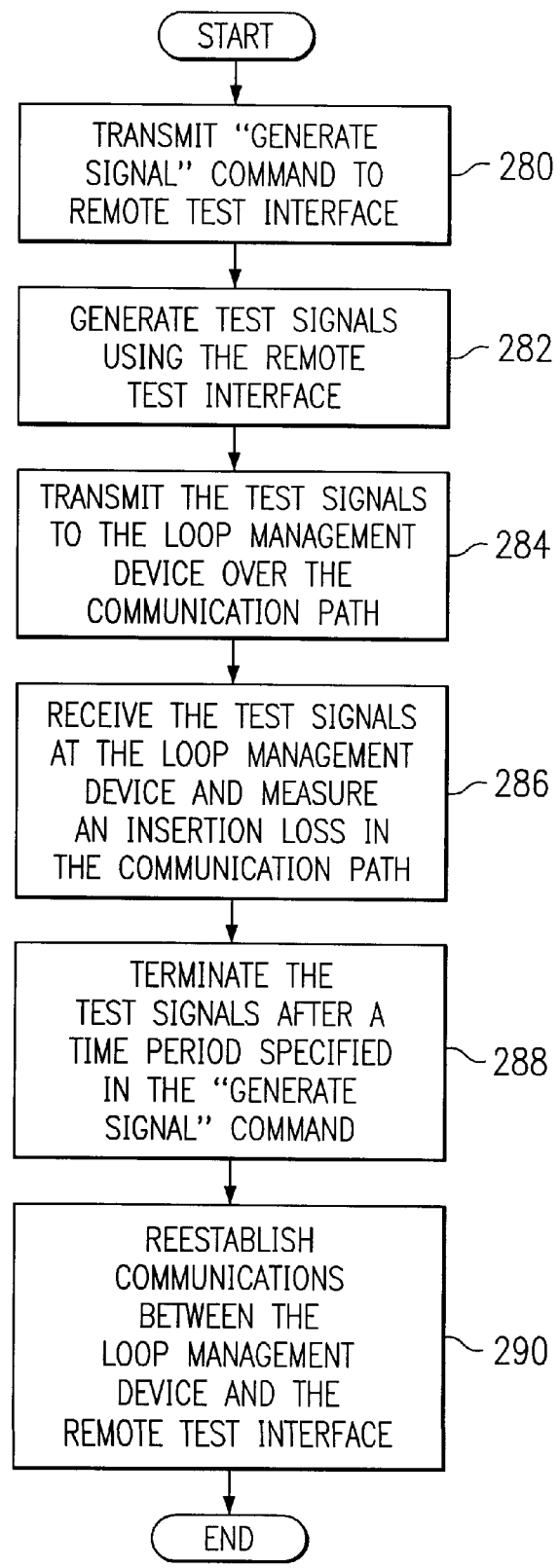

SYSTEM AND METHOD FOR TESTING DIGITAL SUBSCRIBER LINES

CROSS-REFERENCE TO RELATED APPLICATIONS

This application is filed concurrently with the following commonly-owned applications.
SYSTEM AND METHOD FOR TESTING DIGITAL SUBSCRIBER LINES, Ser. No. 09/587,232 now abandoned; and
SYSTEM AND METHOD FOR TESTING DIGITAL SUBSCRIBER LINES, Ser. No. 09/586,333 now abandoned.

TECHNICAL FIELD OF THE INVENTION

This invention relates generally to the field of digital subscriber line (DSL) technology, and more specifically to a system and method for testing digital subscriber lines.

BACKGROUND OF THE INVENTION

Digital subscriber line (DSL) technology provides high bandwidth data transfer capabilities using the same connections that have traditionally been used for telephone and voice-band modem communication. These connections are the twisted copper wire pairs connected between the telephone central office (CO) and the customer premises which are referred to as the "local loop". In order to achieve high data transfer rates over the twisted wire pairs, DSL operates at considerably higher frequencies than e traditional voice-band communication. These high frequency signals are more sensitive to the length and quality of the local loop than the voice-band signals (which are typically less than approximately 4 kHz), and therefore more sophisticated methods of provisioning and management are required to successfully implement DSL.

DSL operates over a limited distance, requiring termination equipment in the central office nearest to the subscriber. Therefore, DSL providers must deploy such equipment at each central office from which they want to offer DSL service. In addition, equipment is also typically installed at the customer premises. Due to the expansive network of equipment that is required, the costs of maintenance and repair of this equipment are significant. In addition, competitive local exchange carriers (CLECs) providing DSL service typically rent space in central offices owned by incumbent local exchange carriers (ILECs), and do not have an on-site presence at the central offices. Therefore, avoiding DSL service outages or degradation, as well as the associated labor and travel costs, are critical to the success of local exchange carriers competing for DSL customers.

SUMMARY OF THE INVENTION

In accordance with the present invention, a system and method for testing digital subscriber lines is provided that substantially eliminates or reduces disadvantages or problems associated with previously developed systems and methods.

In one embodiment of the present invention, a system for testing a communication path for digital subscriber line (DSL) signals includes a loop management device coupled in the communication path between a DSL access multiplexer (DSLAM) and a DSL modem located at a customer premises. The system also includes a remote test interface coupled in the communication path between the loop management device and the DSL modem. The loop management device and the remote test interface communicate using voice-band signals transmitted over the communication path and collaboratively test the communication path.

Technical advantages of the present invention include providing a system and method that automate the process of managing digital subscriber lines. This automation enables a local exchange carrier to deploy DSL services quickly and to manage these services with greater reliability, more efficiency, and less expense than with existing systems and methods. The present invention also allows remote management of the DSL infrastructure in the local loop using two-way, voice-band communication between equipment located in the central office and equipment located at the customer premises. This remote management capability provides a reliable and efficient method of characterizing the local loop prior to service initiation. It also provides a method of diagnosing problems that are encountered in the local loop after DSL service has been implemented. This remote management may be performed over various types of connections, such as an Ethernet connection, an RS-232 serial port connection, or a modem connection.

The system and method of the present invention also provide protection switching by cross-connecting communication lines from their existing connection with a DSL access multiplexer (DSLAM) in the central office to an alternative connection with the DSLAM. For instance, if a DSL modem card in the DSLAM fails, the present invention is capable of switching the existing connections with the failed modem card to an alternative modem card. This cross-connect capability also provides a method of changing the type of DSL service provided to a customer.

Other technical advantages are readily apparent to one skilled in the art from the following figures, descriptions, and claims.

BRIEF DESCRIPTION OF THE DRAWINGS

For a more complete understanding of the present invention, and for further features and advantages thereof, reference is made to the following description, taken in conjunction with the accompanying drawings, in which:

FIG. 5 illustrates an exemplary method of installing a remote test interface and a loop management device;

FIG. 6 illustrates an exemplary method of collaboratively testing a communication path using a loop management device and a remote test interface;

FIG. 7 illustrates an exemplary open loop testing method;

FIG. 8 illustrates an exemplary short loop testing method; and

FIG. 9 illustrates an exemplary signal generation testing method.

DETAILED DESCRIPTION OF THE INVENTION

The present invention provides a system and method for provisioning and managing digital subscriber line (DSL) connections between a central office or other location of service provider equipment and a remote test location, typically at a customer premises. This system and method use a combination of equipment located at the central office (or another suitable location, such as a digital loop carrier (DLC)) and the remote test location to provide two-way, voice-band management of the DSL connections. As used in this application, the term "DSL" encompasses any type of digital subscriber line or related service provided over the local loop connection between customers and the central office. This includes, but is not limited to, asymmetric DSL (ADSL), rate-adaptive ADSL (RADSL), high bit rate DSL (HDSL), symmetric DSL (SDSL), multi-rate SDSL (MSDSL), IDSN-DSL (IDSL), and all other "xDSL" technologies.

Figure 1:
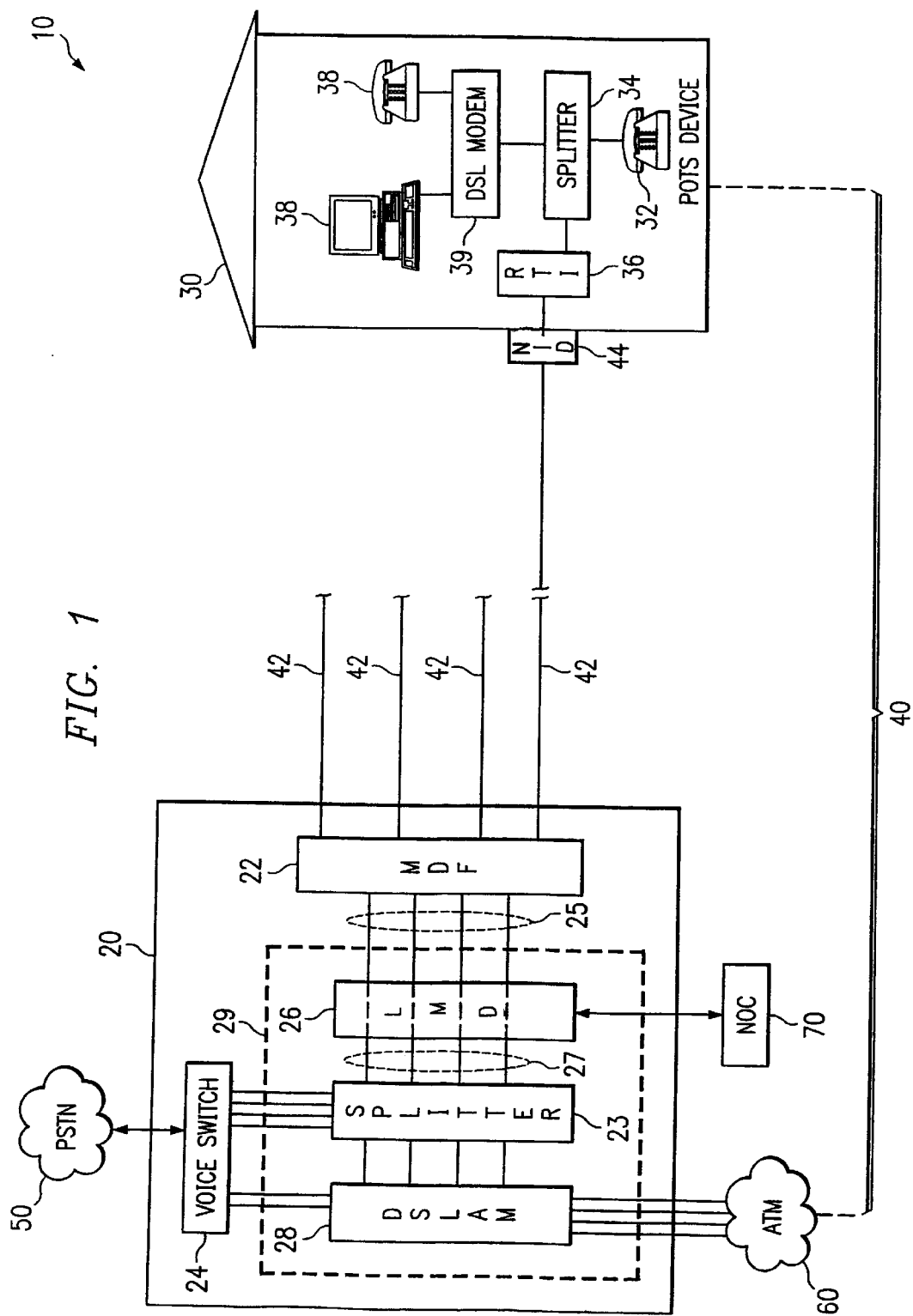
FIG. 1 illustrates a communication network implementing a DSL management system including a loop management device and a remote test interface.

FIG. 1 illustrates a telephone network 10 implementing a DSL management system including a loop management device 26 and a remote test interface (RTI) 36. Network 10 includes a central office 20 that is coupled to one or more customer premises 30 using communication lines 42, which may be referred to as the "local loop." Communication lines 42 are typically twisted copper wire pairs that connect central office 20 and customer premises 30. Communication lines 42 carry both digital DSL signals (which may include digital data and digital voice signals) and analog voice-band signals between central office 20 and customer premises 30 (although sometimes communication lines 42 are terminated at an intermediate location, such as a DLC). Although a single customer premises 30 is illustrated, it should be understood that numerous customer premises 30 may be coupled to central office 20 using one or more communication lines 42.

Voice-band signals originating from one or more plain old telephone service (POTS) devices 32 at customer premises 30 typically pass through a POTS splitter 34 and remote test interface 36, described below, and onto a communication line 42. These voice-band signals are communicated over communication line 42 to central office 20 and to a main distribution frame (MDF) 22. The voice-band signals are communicated from MDF 22 to a POTS splitter 23, through loop management device (LMD) 26, using communication lines 25 and 27. Splitter 23 separates the voice-band signals transmitted over communication line 42 from any DSL signals transmitted over communication line 42. After separating the voice-band signals, splitter 23 communicates the voice-band signals to a voice switch 24, which communicates the voice-band signals to the public switched telephone network (PSTN) 50 or any other appropriate telephone network. Although splitters 23 and 34 are illustrated, certain applications (such as SDSL, HDSL, and IDSL) do not require splitters 23 and 34 (in which case POTS service may not be available). Loop management device 26 and remote test interface 36 may be used with or without splitters 23 and 34.

Voice-band signals originating from PSTN 50 and destined for POTS device 32 or other devices at customer premises 30 are communicated in an analogous, but reverse, manner. These voice-band signals are communicated from PSTN 50 to voice switch 24, and from voice switch 24 through POTS splitter 23 to main distribution frame 22. The signals are then communicated over communication line 42 through remote test interface 36 to POTS splitter 34. POTS splitter 34 splits the voice-band signals from any DSL signals and communicates the voice-band signals to POTS device 32.

As illustrated in FIG. 1, loop management device 26 may be located in central office 20 between MDF 22 and splitter 23. Loop management device 26 may be located along with splitter 23 and DSLAM 28 in a co-location cage 29 containing property of a competitive local exchange carrier (CLEC) that is leasing space in central office 20 from an incumbent local exchange carrier (ILEC). Communication lines 25, each of which are typically twisted copper wire pairs, couple loop management device 26 to MDF 22 and carry both voice-band and DSL signals between MDF 22 and loop management device 26. Communication lines 27, each of which are also typically copper wire pairs, couple loop management device 26 to splitter 23 and carry both voice-band and DSL signals between loop management device 26 and splitter 23.

Remote test interface 36 may be located at customer premises 30 and installed between central office 20 and splitter 34. Alternatively, remote test interface 36 may take the form of or may be incorporated in a portable, hand-held device that may be coupled to communication line 42 anywhere between loop management device 26 and a customer premises 30. Communication line 42, over which DSL and voice-band signals are transmitted to customer premises 30, may be terminated at a network interface device (NID) 44 located outside of customer premises 30 (although NID 44 may be located anywhere in customer premises 30). Wiring running through customer premises 30 couples remote test interface 36 to NID 44 and carries both voice-band and DSL signals between NID 44 and remote test interface 36.

DSL signals are sent from one or more DSL devices 38, which may include, but are not limited to, computers and DSL telephones. The digital data is transmitted to a DSL modem 39 which formats the data for transmission in the frequency bandwidth designated for the DSL technology being used (these frequencies are typically higher than the frequencies used to transmit the analog voice-band signals). The DSL signals are transmitted through splitter 34 and remote test interface 36 (either or both of which may be incorporated with modem 39, in which case appropriate electrical paths are used to interconnect these devices and/or components) to communication line 42, which transmits the signals to MDF 22 in central office 20. The DSL signals are then communicated to loop management device 26, which (when not performing certain management functions described below) passes the signals to splitter 23. Splitter 23 communicates the DSL signals to a DSL access multiplexer (DSLAM) 28. DSLAM 28 includes (or is associated with) one or more DSL modems which format the incoming DSL signals for transmission over an appropriate data network, such as an ATM network 60. If the incoming DSL signals are digital voice signals (typically referred to as Voice over DSL) from a DSL telephone 38, the signals are formatted for and transmitted to voice switch 24, or any other appropriate device coupled to PSTN 50.

Digital data from ATM network 60 (or from any other data network to which DSLAM 28 is coupled) that is directed to a DSL device 38 at customer premises 30 is communicated to customer premises 30 in an analogous, but reverse, manner as described above. The digital data is communicated to DSLAM 28, which formats the data from transmission as DSL signals. The DSL signals are then transmitted through splitter 23, loop management device 26 (when it is not performing management functions described below), and MDF 22 to communication line 42, which transmits the signals to customer premises 30. The DSL signals are passed through remote test interface 36 (when it is not performing management functions described below) to splitter 34, which directs the DSL signals to DSL modem 39. DSL modem 39 then formats the signals for use by DSL devices 38.

In summary, the DSL signals are communicated between DSLAM 28 and DSL modem 39 using a communication path 40. Communication path 40 includes communication line 42 and the other communication lines or other electrical connections between DSLAM 28 and DSL modem 39. Under normal operating circumstances, the DSL signals are communicated substantially unaltered between DSLAM 28 and DSL modem 39. However, as described below, loop management device 26 and remote test interface 36 may interrupt the transmission of the DSL signals to test and otherwise manage the DSL service provided over communication path 40.

With the exception of loop management device 26 and remote test interface 36, DSL network 10 represents a typical network for providing voice-band and DSL service over the local loop. Without the presence of loop management device 26 and remote test interface 36, testing, provisioning, maintenance, and other management of DSL services over communication path 40 are often performed manually using expensive and inefficient methods. The addition of loop management device 26 and remote test interface 36 allows this management of DSL services to be performed automatically and to be controlled from a remote location, such as a network operations center (NOC) 70 coupled to loop management device 26.

Using the connections described above, loop management device 26 and remote test interface 36 are capable of communicating with each other using voice-band or any other appropriate type of signals. Because of their respective locations, loop management device 26 and remote test interface 36 may perform such communications while disconnected from DSLAM 28 and DSL modem 39. This functionality, as will be described in further detail below, allows loop management device 26 and remote test interface 36 to collaboratively test DSL services without interference from DSL modems and allows loop management device 26 and remote test interface 36 to communicate using voice-band signals even when DSL service is inoperative. In addition, due to the presence of remote test interface 36 at customer premises 30 (or elsewhere along communication path 40), two-ended testing of communication path 40 may be performed without sending a technician out into the field.

Figure 2:
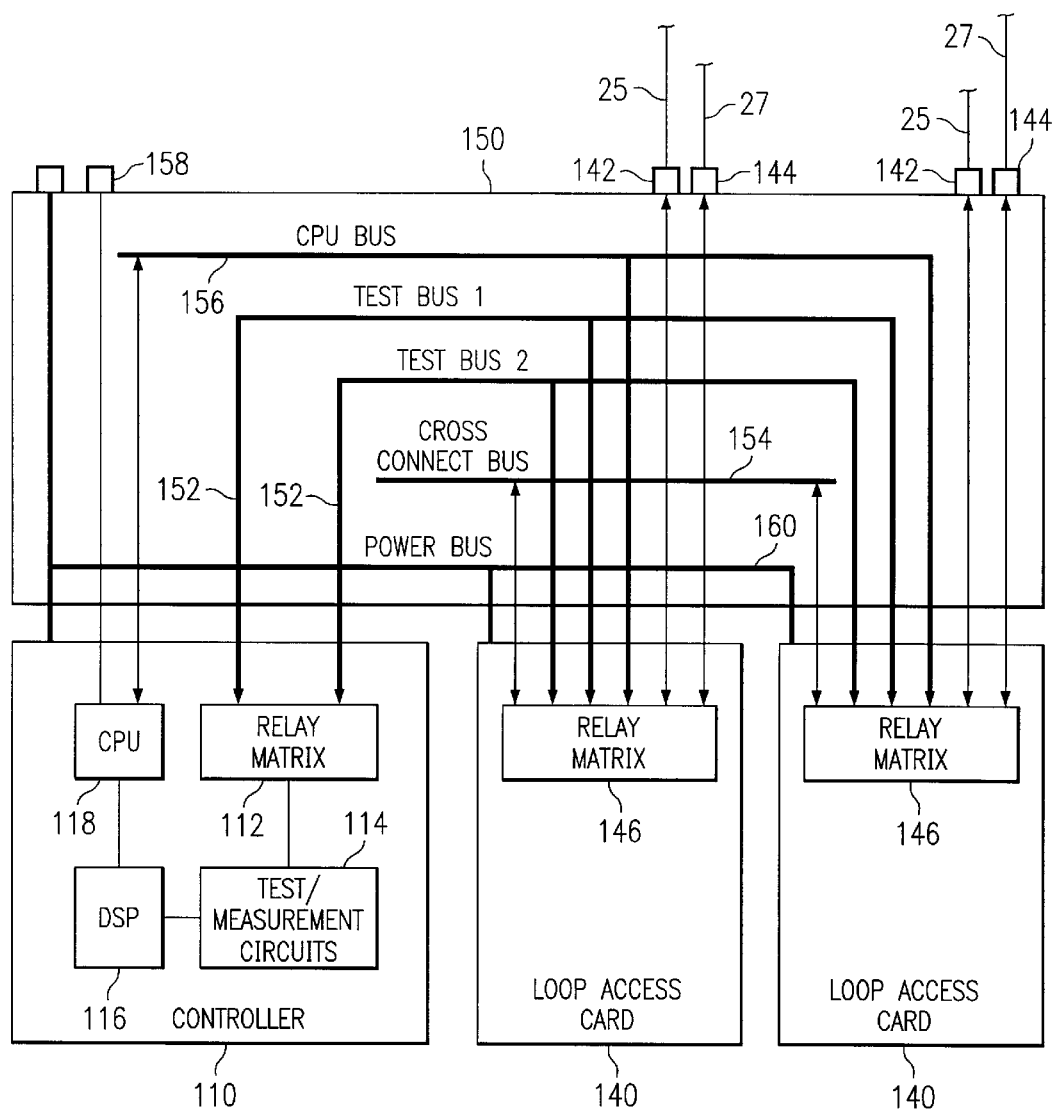
FIG. 2 illustrates a loop management device in further detail.

FIG. 2 illustrates loop management device 26 in further detail. Loop management device 26 includes a controller card 110 and one or more loop access cards 140. Controller card 110 controls loop access cards 140 and enables management and testing of the communication lines 25 and 27 (and of communication path 40, of which lines 25 and 27 are a part) coupled to each loop access card 140. Loop access cards 140 and controller card 110 may be implemented in any appropriate form and are not limited to "cards" or circuit boards. Although only a single line 25 and a single line 27 are illustrated as coupled to each loop access card 140 in FIG. 2, it should be understood that lines 25 and 27 may each include multiple lines. In one embodiment, each line 25 and 27 includes a twisted copper wire pair. Each line 25 and 27 is coupled to loop management device 26 using interfaces 142 and 144, respectively.

Interface 142 of each loop access card 140 is electrically coupled to a corresponding interface 144 using a relay matrix 146, so that the signals communicated from MDF 22 (such as signals transmitted from customer premises 30) using lines 25 may be communicated, if appropriate, through loop access card 140 to lines 27 coupling loop management device 26 to splitter 23 (and DSLAM 28). Likewise, signals communicated from splitter 23 using lines 27 may be communicated, if appropriate, through loop access card 140 to lines 25 coupling loop management device 26 to MDF 22. In one embodiment, interfaces 142 and 144 are each standard 50-pin "telco" connectors which can couple up to twenty-five twisted pairs or other appropriate communication lines to each loop access card 140. Any other appropriate type of interfaces 142 and 144 may be used instead of or in addition to 50-pin connectors.

Controller card 110 and loop access cards 140 are each coupled to a backplane 150 of loop management device 26. Controller card 110 is coupled to each loop access card 140 using one or more buses in backplane 150. Controller card 110 is coupled to the relay matrix 146 of each loop access card 140 using one or more test buses 152. In one embodiment, a relay matrix 112 of controller card 110 is coupled to test buses 152 to control access to test buses 152 by the other components of controller card 110. Since the signals transmitted between DSLAM 28 and customer premises 30 over communication lines 25 and 27 pass through a loop access card 140, controller card 110 is capable of controlling the transmission of these signals and capable of testing communication path 40 over which the signals are transmitted.

Controller card 110 may access one or more communication lines 25 to test the line 25 using test and measurement circuits 114 and a digital signal processor (DSP). 116. Controller card 110 may also use one or more switches in relay matrix 146 of a loop access card 140 to disconnect communication lines 25 from communications lines 27. This disconnection prevents interference caused by DSLAM 28 from disrupting a test of the portion of communication path 40 between loop management device 26 and remote test interface 36. Controller card 110 is further operable to communicate with remote test interface 36 using a modem or any other appropriate device.

In addition to accessing and testing communication lines 25 and 27, controller card 110 may also use loop access cards 140 to provide protection switching for lines 25 and 27. For example, in a normal operating mode, each line 25 may be coupled to a corresponding line 27 based on the manner in which lines 25 and 27 interface with a loop 30 access card 140. For example, a first line 25 may include two wires that are coupled to pin #1 and pin #2 of interface 142, and a second line 27 may include two wires that are coupled to pin #1 and pin #2 of interface 144. However, if the DSL modem in DSLAM 28 to which line 27 is coupled fails, controller card 110 may disconnect the first line 25 from the second line 27 using relay matrix 146 and may connect the first line 25 to a third line 27 that is coupled to an operable DSL modem in DSLAM 28. This "cross-connecting" may be performed between lines 25 and 27 coupled to the same loop access card 140 using the card's relay matrix 146 or it may be performed between a line 25 coupled to one loop access card 140 and a line 27 coupled to another loop access card 140 using a cross-connect bus 154 that couples loop access cards 140.

In addition to test buses 152 and cross-connect bus 154, backplane 150 may also include a central processing unit (CPU) bus 156 that couples a CPU 118 of controller card 110 to the relay matrix 146 of each loop access card 140. CPU 118 may then be used to control each switch matrix 146 to provide controller card 110 with access to particular communication lines 25 and 27 for testing and to control protection switching of communication lines 25 and 27. CPU 118 may also be coupled to one or more external communication interfaces 158 that provide external access to controller card 110. For example but not by way of limitation, NOC 70 may be coupled A to controller card 110 using external interface 158. Backplane 150 also includes a power bus 160 that couples controller card 110 and loop access cards 140 to a power source that provides electrical power for the operation of cards 110 and 140.

Figure 3:
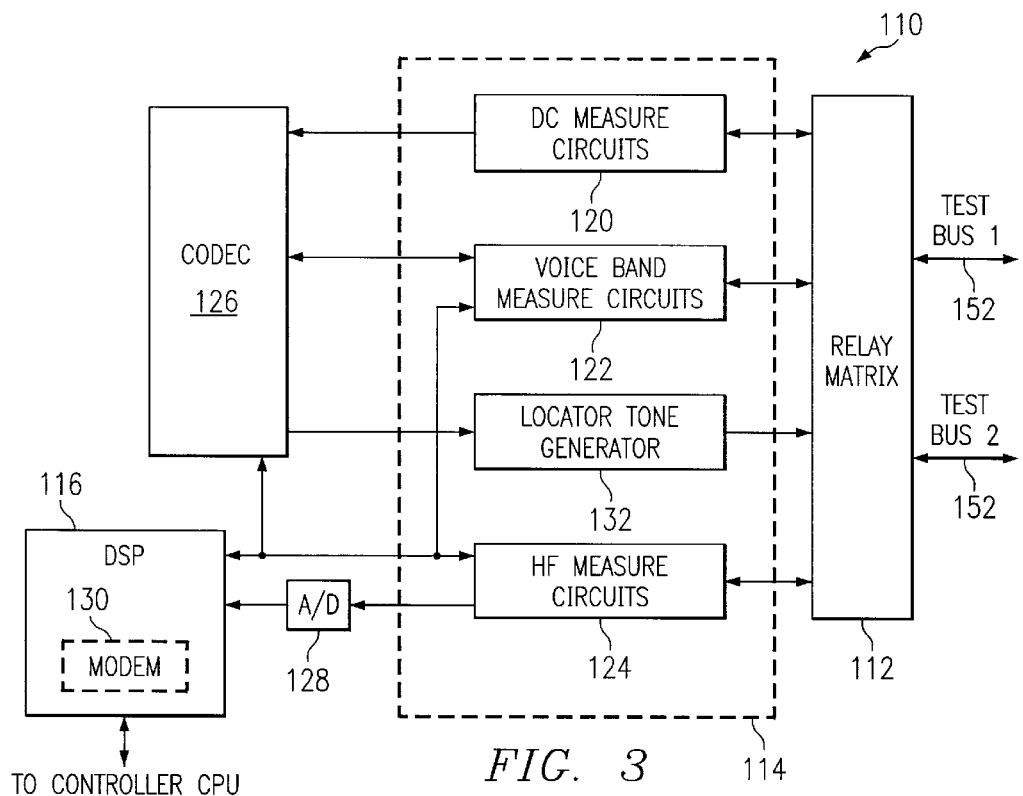
FIG. 3 illustrates a portion of a controller card of a loop management device in further detail.

FIG. 3 illustrates a portion of controller card 110 in further detail. As described above, relay matrix 112 is coupled to one or more test buses 152. Relay matrix 112 couples test buses 152 to test and measurement circuits 114 and provides circuits 114 with access to communication lines 25 and 27. In one embodiment, relay matrix 112 is coupled to measurement circuits 114 that include direct current (DC) measurement circuits 120, voice-band measurement circuits 122, and high frequency measurements circuits 124, singly or in any suitable combination. DC measurement circuits 120 facilitate the measurement of voltage, current, resistance, capacitance, and other appropriate electrical parameters of a communication path 40 coupled to a loop access card 140. DC measurement circuits 120 may condition signals received from communication path 40 and communicate the conditioned signals to a codec 126 which converts the analog measurements to a digital format. Codec 122 may then communicate the measurements to DSP 116 to allow DSP 116 to determine characteristics of communication path 40.

Voice-band measurement circuits 122 may facilitate the measurement of signals transmitted over a communication path 40 in the voice frequency band. For example, voice-band measurement circuits 122 may condition voice-band signals received from communication line 40 and communicate these conditioned signals to codec 126 for communication to DSP 116. DSP 116 may then determine a noise level or other appropriate characteristics of communication path 40.

High frequency measurement circuits 124 may receive signals from communication path 40 at a higher frequency range than voice-band measurement circuits 122. High frequency measurement circuits 124 may perform a similar function as voice-band measurement circuits 122. For example, high frequency measurement circuits 124 may condition signals received in a selected frequency range, such as a DSL signal frequency range. High frequency measurement circuits 124 may communicate these conditioned signals to DSP 116 to determine the amount of noise in the DSL frequency band. In addition, high frequency measurement circuits 124 may receive signals generated by remote test interface 36 during a test initiated by controller card 110, as will be described in greater detail below. High frequency measurement circuits 124 receive and condition these signals from remote test interface 36 and may present these signals to an analog-to-digital converter 128 for transmission to DSP 116. DSP 116 may then perform a spectral or other appropriate analysis of the signals transmitted from remote test interface 36. Measurement circuits 114 may also perform any other appropriate functions to facilitate the measurement and testing of the characteristics of communication path 40.

In addition to testing communication path 40, controller card 112 also communicates with remote test interface 36 to facilitate the testing of communication path 40 and to otherwise manage the DSL service using communication path 40. For example, controller card 110 may communicate with remote test interface 36 to instruct remote test interface 36 to transmit the high frequency signals to be received by high frequency measurements circuits 124. Controller card 110 may also communicate with remote test interface 36 to instruct remote test interface 36 to perform other functions related to the testing of communication path 40, as will be described below. The types of test and measurement circuits 114 described above are well known in the art and may be implemented in any appropriate manner.

In one embodiment, DSP 116 communicates with remote test interface 36 using voice-band signals communicated from DSP 116 through codec 126 to voice-band measurement circuits 122. Voice-band measurement circuits 122 are used to communicate the voice-band signals to relay matrix 112, which communicates the signals using a test bus 152 to a relay card 140. Relay card 140 communicates the signals to remote test interface 36 over communication path 40. Controller card 110 may use a modem 130 to communicate with remote test interface 36. Modem 130 may be included as hardware in controller card 110, incorporated as software in DSP 116, or implemented in any other appropriate manner. Controller card 110 may communicate with remote test interface 36 using any other appropriate method, including DSL signals communicated through high frequency measurement circuits 124.

Controller card 110 may include a locator tone generator 132 that generates a tone that is communicated, using relay matrix 112, over a communication path 40 to assist in the installation of remote test interface 36. Remote test interface 36 may use the locator tone communicated from controller card 110 to determine when it is coupled to the correct communication path 40 (for example, when remote test interface is installed at a location at which multiple communication lines 42 are terminated). In addition to the components described above, any other appropriate testing, measurement, or communication components may be included in controller card 110.

Figure 4:
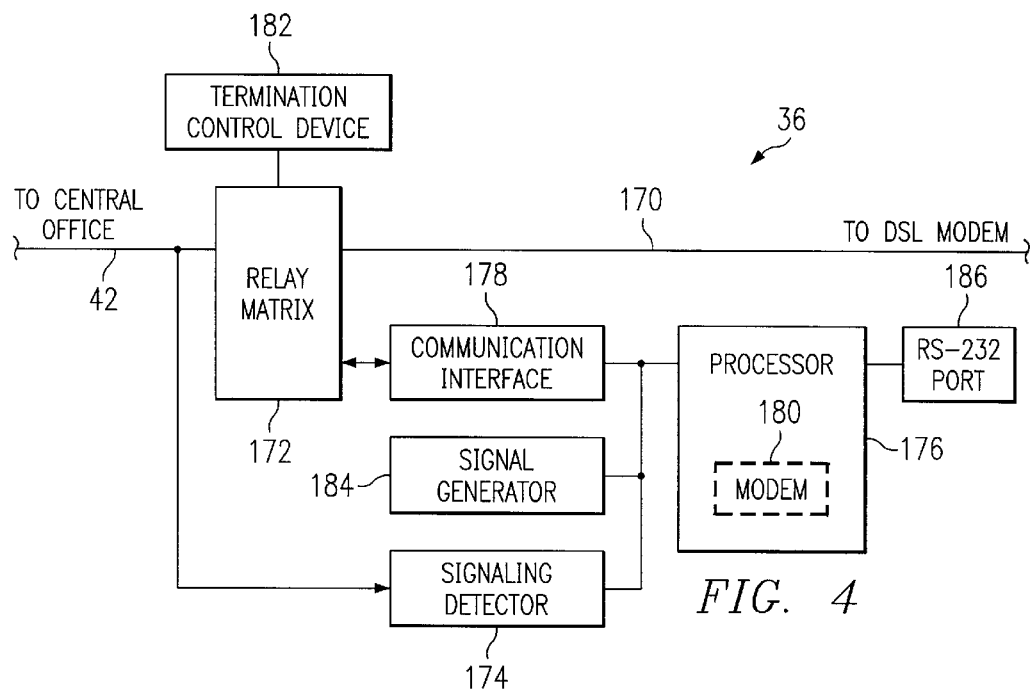
FIG. 4 illustrates a remote test interface in greater detail.

FIG. 4 illustrates remote test interface 36 in greater detail. As described above, remote test interface 36 is coupled to communication path 40. In one embodiment, remote test interface 36 is coupled to central office 20 using communication line 42 and is coupled to a DSL modem 39 using a communication line 170 (where communication lines 42 and 170 are part of communication path 40). Communication line 170 may be coupled to splitter 34, as illustrated in FIG. 1, or it may be coupled directly to DSL modem 39 or any other appropriate device. In addition, remote test interface 36 may be incorporated with DSL modem 39, and communication line 170 may include appropriate electrical connections coupling one or more components of remote test interface 36 to one or more components of DSL modem 39. A relay matrix 172 couples communication line 42 to communication line 170. When remote test interface 36 is not being used for testing, relay matrix 172 couples communication lines 42 and 170 to allow voice-band and DSL signals to be sent between central office 20 and the devices at customer premises 30.

As described above, remote test interface 36 is used in conjunction with loop management device 26 to test a portion of communication path 40 between loop management device 26 and remote test interface 36 (which in one embodiment includes communication lines 25 and 42). To initiate the testing of communication path 40, loop management device 26 may transmit a start test signal over communication path 40. The start test signal may be a voice-band signal having a frequency that does not interfere with modem or other voice-band communications. In a particular embodiment, a start test signal having a frequency of 2713 Hz is used. A signaling detector 174 of remote test interface 36 is coupled to communication line 42 and receives the start test signal communicated from loop management device 26. Signaling detector 174 communicates the detection of the start test signal to a processor 176.

In response to the start test signal, processor 176 instructs relay matrix 172 to connect communication line 42 with a communication interface 178 of remote test interface 36. Relay matrix 172 may continue to connect communication line 42 to communication line 170 to allow voice-band and DSL signals to be communicated between lines 42 and 170. Alternatively, relay matrix 172 may disconnect communication lines 42 and 170 when connecting communication line 42 to communication interface 178.

When communication line 42 is coupled to communication interface 178 using relay matrix 172, loop management device 26 and remote test interface 36 may establish a communication session. In one embodiment, a voice-band modem 180 of remote test interface 36 communicates with voice-band modem 130 of controller card 110 of loop management device 26. As with modem 130, modem 180 may be incorporated as software in processor 176 or may be included as hardware or in any other appropriate form in remote test interface 36. Modems 130 and 180 may establish a communication session using any appropriate communications protocol. One advantage of the present invention includes the ability of loop management device 26 and remote test interface 36 to communicate using voice-band signals communicated by modems 130 and 180 or any other appropriate device. Since these communications may be in the voice-band, loop management device 26 and remote test interface 36 may communicate and test communication path 40 even when the DSL service is inoperative.

Once the communication session between loop management device 26 and remote test interface 36 is established, loop management device 26 may send commands to remote test interface 36 to allow loop management device 26 to test communication path 40. Two exemplary commands that may be used in conjunction with the testing of communication path 40 are an "open loop" command and a "short loop" command. Communication lines 42 and 170 typically include a tip wire and a ring wire (or an electrical equivalent). An open loop command communicated from loop management device 26 instructs remote test interface 36 to disconnect the tip and ring wires of communication line 42 from the tip and ring wires of communication line 170, and to leave the tip and ring wires of communication line 42 unconnected (forming an "open circuit"). Processor 176 instructs relay matrix 172 to switch the tip and ring wires of communication line 42 to a termination control device 182 such that the tip and ring wires of communication line 42 are left unconnected to form the open circuit. Termination control device 182 may be a component of relay matrix 172 and it allows relay matrix 172 to terminate the tip and ring wires in different ways.

When a short loop command is received from loop management device 26, a similar process is performed except that processor 176 instructs relay matrix 172 to switch the tip and ring wires of communication line 42 to termination control device 182 such that the tip and ring wires are connected to form a short circuit. Once the open or short circuit is formed, loop management device 26 may perform tests of the open or short circuit using test and measurement circuits 114. When the open or short circuit is formed in communication line 42, the communication link between remote test interface 36 and loop management device 26 may be broken. Therefore, the open loop and the short loop commands sent by loop management device 26 may include a test duration that indicates the length of time for which the open or short circuit is to be formed. When the time period indicated in the command has expired, processor 176 instructs relay matrix 172 to reconnect communication line 42 to communication interface 178, and modem 180 or any other appropriate component may reestablish the communications session between remote test interface 36 and loop management device 26 (or loop management device 26 may reestablish the communications session).

Another command that may be sent by loop management device 26 is a "generate signal" command. This command indicates that a signal generator 184 of remote test interface 36 is to generate signals and communicate the signals over communication line 42 to loop management device 26. For example, these signals may include individual sine waves or other appropriate waveforms each having a different frequency ranging from approximately 300 Hz to 2.0 MHz (or any other appropriate frequency range), that are sent sequentially to loop management device 26 for measurement. Alternatively, signal generator 184 may generate a spread spectrum signal, such as a white noise signal, that includes frequencies ranging from approximately 300 Hz to 2.0 MHz (or any other appropriate frequency range). Loop management device 26 may measure this spread spectrum signal, or the individual signals described above, to determine an insertion loss in the portion of communication path 40 between loop management device 26 and remote test interface 36.

It should be noted that loop management device 26 may also include a signal generator and remote test interface 36 may include appropriate components to receive and perform testing on signals sent from this signal generator of loop management device 26. Furthermore, remote test interface 36 may also include any other appropriate measurement circuits and related components, such as measurement circuits 114 of loop management device 26, to allow remote test interface 36 to perform the testing described above in conjunction with measurement circuits 114 or to perform any other appropriate testing of communication path 40.

In addition to its use for testing communication path 40, remote test interface 36 may also be used to communicate with DSL modem 39. Remote test interface 36 may include an RS-232 port 186, or any other appropriate external communication interface, to which an auxiliary communication line from DSL modem 39 may be connected. In one embodiment, a serial cable is connected between RS-232 port 186 and an RS-232 port of DSL modem 39. This auxiliary communication line may be used to configure or otherwise communicate with DSL modem 39 when DSL service is inoperative. For example, NOC 70 may communicate messages to loop management device 26, which may communicate the messages to remote test interface 36 using voice-band signals. Processor 176 may then convert the voice-band communications to a format appropriate for transmission over the auxiliary communication line and transmit the messages to DSL modem 39.

FIG. 5 illustrates an exemplary method of installing remote test interface 36 and loop management device 26. The method begins at step 202 when loop management device 26 is coupled to a communication path 40 between DSLAM 28 and DSL modem 39. Loop management device 26 transmits a locator tone over communication path 40 at step 204. Remote test interface 36 is coupled to communication path 40 at step 206, and detects the locator tone transmitted from loop management device 26 at step 208. The locator tone may be used by a person installing remote test interface 36 to find the correct communication path 40 to which remote test interface 36 is to be coupled. When remote test interface 36 is coupled to communication path 40 and detects the locator tone, remote test interface 36 transmits an acknowledge signal over communication path 40 to loop management device 26 at step 210. Remote test interface 36 then waits at step 212 for a start test signal or other communication from loop management device 26, and the method ends.

FIG. 6 illustrates an exemplary method of collaboratively testing a communication path 40 using loop management device 26 and remote test interface 36. The method begins at step 220 by installing loop management device 26 and remote test interface 36 on communication path 40. This installation may be performed as described in conjunction with FIG. 5 or in any other appropriate manner. Loop management device 26 may disconnect DSLAM 28 from the portion of communication path 40 to be tested at step 221. Loop management device 26 transmits a start test signal over communication path 40 to remote test interface 36 at step 222. Remote test interface 36 detects the start test signal at step 224, and establishes a communication session with loop management device 26 at step 226. As described above, the communication session may be established by coupling communication path 40 to communication interface 178 of remote test interface 36 and establishing communications between modems 130 and 180. In addition, remote test interface 36 may disconnect DSL modem 39 from the portion of communication path 40 to be tested at step 228. Loop management device 26 then transmits test commands to remote test interface 36, such as an open loop or a short loop command to test communication path 40 at step 232, and the method ends.

FIGS. 7–9 illustrate exemplary methods of testing the portion of communication path 40 between loop management device 26 and remote test interface 36. FIG. 7 illustrates an exemplary open loop testing method. The method begins at step 240 when loop management device 26 transmits an open loop command to remote test interface 36. As described above, remote test interface 36 creates an open loop in communication path 40 for an amount of time specified in the open loop command at step 242. Loop management device 26 then performs testing of communication path 40 at step 244. This testing may include, for example only and without limitation, noise measurements facilitated using voice-band measurement circuits 122 of loop management device 26 or capacitance measurements facilitated using DC measurement circuits 120 of loop management device 26. Other appropriate tests may also be performed on the open loop. Once the time period specified in the open loop command has expired, relay matrix 172 reconnects communication path 40 to communication interface 178 at step 246, remote test interface 36 may reestablish communications with loop management device 26 at step 248 (or loop management device 26 may reestablish the communications session), and the method ends.

FIG. 8 illustrates an exemplary short loop testing method. The method begins at step 260 when loop management device 26 transmits a short loop command to remote test interface 36. As described above, remote test interface 36 forms a short circuit in communication path 40 at step 262 by connecting the tip and ring wires of communication line 42 for an amount of time specified in the short loop command. Loop management device 26 then performs testing on communication path 40 at step 264. This testing may include, for example only and without limitation, measuring a loop resistance using DC measurement circuits 120 and DSP 116 of loop management device 26 to allow DSP 116 to determine a total length of the portion of communication path 40 being tested. Relay matrix 172 of remote test interface 36 reconnects communication path 40 to communication interface 128 at step 266 at the end of the time period specified in the short loop command. Remote test interface may then reestablish communication with loop management device 26 at step 268 (or loop management device 26 may reestablish the communications session), and the method ends.

FIG. 9 illustrates an exemplary signal generation testing method. The method begins at step 280 when loop management device 26 transmits a generate signal command to remote test interface 36. Remote test interface 36 generates test signals using signal generator 184 at step 282, as described above. The signals are generated for a time period and frequency range specified in the generate signal command or according to a predefined test sequence. The generated signals are transmitted over communication path 40 to loop management device 26 at step 284. Loop management device 26 receives the test signals and performs measurements on the signals at step 286. Depending on the frequency of the signals, loop management device 26 may receive the signals using voice-band measurement circuits 122 and/or high frequency management circuits 124. Loop management device 26 may measure the signals to determine an insertion loss in the portion of communication path 40 being tested, or perform any other appropriate operation. Remote test interface 36 terminates the test signals at step 288 as specified by the generate signal command or the predefined test sequence. Remote test interface 36 may then reestablish communication with loop management device 26 at step 290 (or loop management device 26 may reestablish the communications session), and the method ends.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A system for testing a communication path for digital subscriber line (DSL) signals, comprising:
   a loop management device coupled in the communication path between a DSL access multiplexer (DSLAM) and a DSL modem located at a customer premises;
   a remote test interface coupled in the communication path between the loop management device and the DSL modem, comprising a first interface coupled to a first portion of the communication path, the first portion of the communication oath coupled to the DSL modem, said first portion comprises a tip wire and a ring wire;
   a second interface coupled to a second portion of the communication path, the second portion of the communication oath coupled to the loop management device, wherein the remote test interface is further operable to disconnect the first portion of the communication oath from the second Portion of the communication path to perform testing of the second portion in collaboration with the loop management device, said second portion comprises a tip wire and a ring wire; wherein, the loop management device and the remote test interface are operable to communicate using voice-band signals transmitted over the communication path and the loop management device and the remote test interface are further operable to collaboratively test the communication path without the use of a trained technician by providing a locator tone in order to find the communication oath and the remote test interface is still further operable to disconnect the tip wire of the first portion from the tip wire of the second portion and disconnect the ring wire of the first portion from the ring wire of the second portion to form an open circuit for testing.

2. The system of claim 1, wherein the loop management device is further operable to transmit an open loop signal to the remote test interface, the open loop signal instructing the remote test interface to form the open circuit for a specified period of time.

3. The system of claim 1, wherein the loop management device is further operable to measure noise on the second portion of the communication path.

4. The system of claim 1, wherein the loop management device is further operable to measure a capacitance of the second portion of the communication path.

5. The system of claim 1, wherein:
the remote test interface is further operable to transmit test signals over the second portion of the communication path; and
the loop management device is further operable to receive the test signals and measure an insertion loss in the second portion of the communication path.

6. A system for testing a communication path for digital subscriber line (DSL) signals, comprising:
a loop management device coupled in the communication path between a DSL access multiplexer (DSLAM) and a DSL modem located at a customer premises;
a remote test interface coupled in the communication path between the loop management device and the DSL modem, comprising a first interface is coupled to a first portion of the communication path, the first portion of the communication oath coupled to the DSL modem, said first portion comprises a tip wire and a ring wire;
a second interface coupled to a second portion of the communication path, the second portion of the communication path coupled to the loop management device, wherein the remote test interface is further operable to disconnect the first portion of the communication path from the second portion of the communication path to perform testing of the second portion in collaboration with the loop management device, said second portion comprises a tip wire and a ring wire; wherein the loon management device and the remote test interface operable to communicate using voice-band signals transmitted over the communication path and the loon management device and the remote test interface are further operable to collaboratively test the communication path without the use of a trained technician by providing a locator tone in order to find the communication path and the remote test interface is further operable to disconnect the tip wire of the first portion from the tip wire of the second portion and disconnect the ring wire of the first portion from the ring wire of the second portion; and
the remote test interface is still further operable to connect the tip wire and the ring wire of the second portion to form a short circuit for testing.

7. The system of claim 6, wherein the loop management device is further operable to transmit a short loop signal to the remote test interface, the short loop signal instructing the remote test interface to form the short circuit for a specified period of time.

8. The system of claim 6, wherein the loop management device is further operable to measure a resistance of the tip wire and the ring wire of the second portion of the communication path.

9. A method for testing a communication path for digital subscriber line (DSL) signals, comprising:
coupling a loot management device in the communication path between a DSL access multiplexer (DSLAM) and a DSL modem located at a customer premises;
coupling a remote test interface in the communication oath between the loop management device and the DSL modem;
transmitting voice-band signals between the loop management device and the remote test interface over the communication path to facilitate communication between the loop management device and the remote test interface;
testing the communication oath using the loop management device in collaboration with the remote test interface;
disconnecting a first portion and a second portion of the communication path using the remote test interface, comprising:
disconnecting a tip wire of the first portion from a tip wire of the second portion; and
disconnecting a ring wire of the first portion from a ring wire of the second portion to form an open circuit for testing, wherein the first portion of the communication oath is coupled to a first interface of the remote test interface and to the DSL modem, and wherein the second portion of the communication oath coupled to a second interface of the remote test interface and to the loop management device; and
transmitting an open loop signal from the loop management device to the remote test interface, the open loop signal instructing the remote test interface to form the open circuit for a specified period of time.

10. The method of claim 9, further comprising measuring noise on the second portion of the communication path using the loop management device.

11. The method of claim 9, further comprising measuring a capacitance of the second portion of the communication path using the loop management device.

12. The method of claim 9, further comprising:
transmitting test signals from the remote test interface over the second portion of the communication path;
receiving the test signals at the loop management device; and
measuring an insertion loss in the second portion of the communication path.

13. The method of claim 9, further comprising incorporating the remote test interface with the DSL modem.

14. The method of claim 9, further comprising coupling the remote test interface to the DSL modem using an auxiliary communication line to facilitate communication with the DSL modem when a DSL service is inoperative.

15. The method of claim 14, further comprising coupling the auxiliary communication line to an RS-232 serial port of the DSL modem.

16. The method of claim 14, further comprising:
transmitting voice-band signals from the loop management device to the remote test interface over the communication path;
receiving the voice-band signals at the remote test interface;
converting the voice-band signals to a format appropriate for transmission over the auxiliary communication line; and
communicating the voice-band signals to the DSL modem using the auxiliary communication line.

17. The method of claim 9, further comprising:

transmitting a locator tone from the loop management device over the communication path during an installation of the remote test interface;

detecting the locator tone at the remote test interface; and transmitting an acknowledge signal from the remote test interface to the loop management device over the communication path.

18. A method for testing a communication path for digital subscriber line (DSL) signals, comprising:

coupling a loop management device in the communication path between a DSL access multiplexer (DSLAM) and a DSL modem located at a customer premises;

coupling a remote test interface in the communication path between the loop management device and the DSL modem;

transmitting voice-band signals between the loop management device and the remote test interface over the communication path to facilitate communication between the loop management device and the remote test interface;

testing the communication path using the loop management device in collaboration with the remote test interface;

disconnecting a first portion and a second portion of the communication path using the remote test interface, comprising:

disconnecting a tip wire of the first portion from a tip wire of the second portion and disconnecting a ring wire of the first portion from a ring wire of the second portion;

connecting the tip wire and the ring wire of the second portion to form a short circuit for testing; and transmitting a short loop signal from the loop management device to the remote test interface, the short loop signal instructing the remote test interface to form the short circuit for a specified period of time.

19. The method of claim 18, further comprising measuring a resistance of the tip wire and the ring wire of the second portion of the communication path using the loop management device.

* * * * *